United States Patent

Guillez et al.

(10) Patent No.: US 6,669,201 B1
(45) Date of Patent: Dec. 30, 2003

(54) FOLDING ROOF SYSTEM AND VEHICLE EQUIPPED THEREWITH

(75) Inventors: Jean-Marc Guillez, Cirieres (FR); Paul Queveau, Montravers (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/049,299

(22) PCT Filed: Aug. 4, 2000

(86) PCT No.: PCT/FR00/02251

§ 371 (c)(1), (2), (4) Date: Feb. 7, 2002

(87) PCT Pub. No.: WO01/19633

PCT Pub. Date: Mar. 22, 2001

(30) Foreign Application Priority Data

Sep. 10, 1999 (FR) .......................................... 99 11377

(51) Int. Cl.[7] .............................................. B60J 7/047
(52) U.S. Cl. ......................... 276/220.01; 296/216.04; 296/225
(58) Field of Search ............... 296/106, 146.8, 296/220.01, 222, 216.04, 216.05, 225, 216.06, 216.08; 49/198, 194

(56) References Cited

U.S. PATENT DOCUMENTS

| 4,940,282 | A | * | 7/1990 | Townsend ................. 296/204 |
| 5,558,388 | A | * | 9/1996 | Furst et al. ............ 296/216.04 |
| 5,921,611 | A | * | 7/1999 | Townsend ................. 296/106 |
| 6,419,308 | B1 | * | 7/2002 | Corder et al. .......... 296/216.04 |

FOREIGN PATENT DOCUMENTS

| DE | 36 35 888 A | 5/1988 | ............ B60J/7/04 |
| DE | 39 42 746 A | 6/1990 | ............ B60J/7/08 |
| EP | 0 101 322 A | 2/1984 | ............ B60J/7/20 |
| EP | 0 447 781 A2 | 9/1991 | ............ B60J/7/047 |
| FR | 2 694 245 A1 | 7/1992 | ............ B60J/7/04 |
| GB | 530 784 A | 12/1940 | |

\* cited by examiner

Primary Examiner—Joseph D. Pape
Assistant Examiner—Jason Morrow
(74) Attorney, Agent, or Firm—Nawrocki, Rooney & Sivertson, P.A.

(57) ABSTRACT

The sunroof system (1) for a vehicle (2) comprises, for guiding the movement of the panels (3, 4), two parallel curved runners (5) fixed to the bodywork of the vehicle and each extending between a point (A) close to the front of the central panel (4) and a point (B) close to the bottom of the rear boot (7) of the vehicle and the rear part (9) of the cabin (6).

8 Claims, 6 Drawing Sheets

FOLDING ROOF SYSTEM AND VEHICLE EQUIPPED THEREWITH

Figure 1:
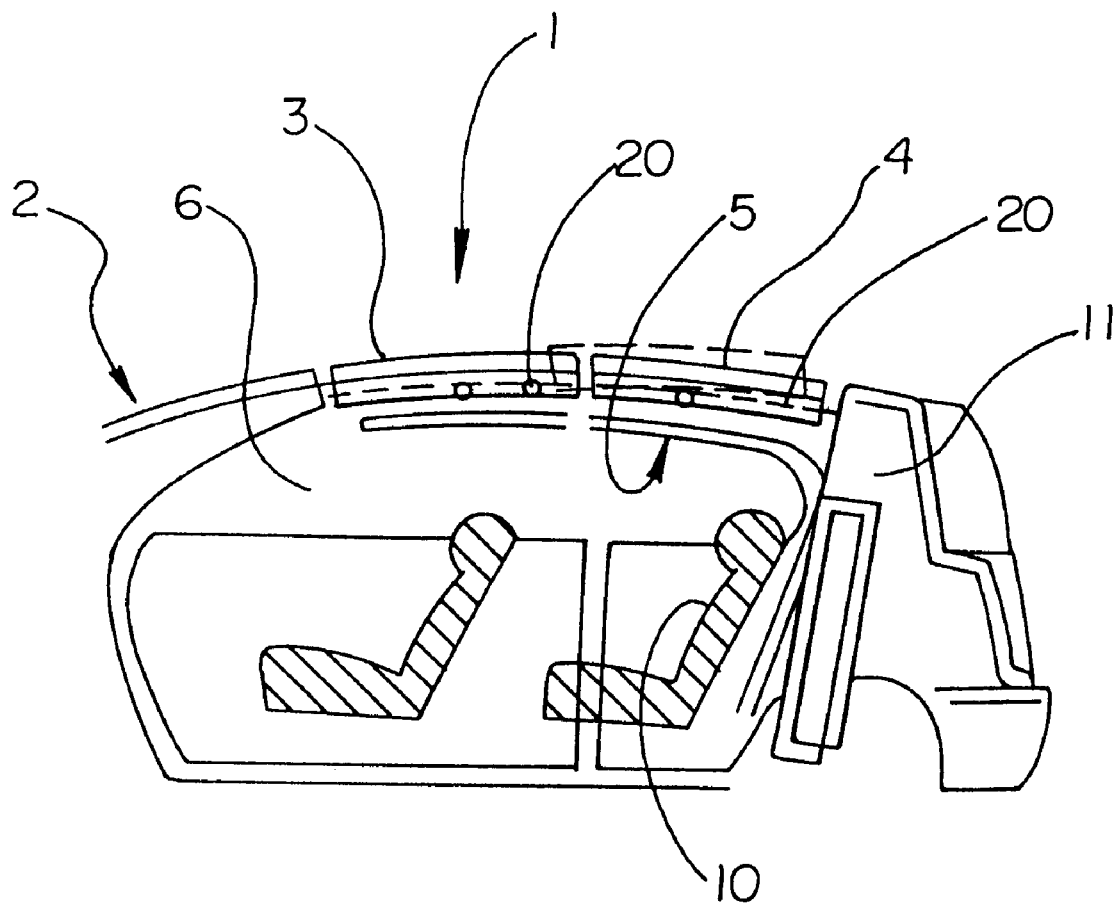

The present invention relates to a sunroof system for a fixed or movable structure notably for a vehicle, for example a vehicle or a boat.

There is known, from FR-B-2 694 245 in the name of the Applicant, a sunroof system for a vehicle consisting of at least two rigid panels, respectively a first front panel and a second central panel, fixed to each other by sliding means arranged so that the front panel is able to move between a closed position, in which it covers the cabin, and an open position in which it is, after sliding towards the rear, superimposed on the central panel, the central panel being mounted so as to pivot on side arms each fixed at one end to the central panel and at the other end to an articulation point fixed to the chassis of the vehicle, the central panel being adapted to pivot, whilst driving the front panel which is superimposed on it, between a closed position in which it covers the cabin and an open position in which the front panel and the central panel are housed, in their superimposed position, substantially vertically behind the vehicle cabin, the sliding means comprising a front runner fixed to the front panel, a rear runner fixed to the central panel, and an intermediate runner slidably connected, by means of rollers and grooves, both to the front runner and to the rear runner.

The purpose of the present invention is to remedy the drawbacks of the aforementioned system and to propose improvements to this system allowing a simple and reliable design which can be adapted to different types of vehicle bodywork or to different types of fixed or movable structure.

According to the present invention, the sunroof system of the aforementioned type is characterised in that it has two parallel arched runners fixed to the vehicle bodywork and each extending between a point close to the front of the central panel and a point close to the bottom of the rear boot of the vehicle and the rear part of the cabin, the central panel having members cooperating with the two runners in order to guide its movement along these.

Such a sunroof system is simple in design and allows a precise guiding of the movement of the two superimposed panels between the closed position and the open position in which they are stored in the boot and occupy a small volume thereof.

According to a preferred version of the invention, the arched shape of the runners has a convexity directed towards the inside of the boot.

This shape is adapted to the geometry of the vehicle.

Preferably, the members cooperating with the two runners comprise two rollers fixed to each of the lateral edges of the central panel, respectively close to the front and close to the rear of the latter.

According to an advantageous version of the invention, the rollers are shaped like pinions meshed in a rack fixed to each runner and following the profile thereof.

In this version, one of the pairs of rollers is driven in rotation by an electric motor connected to each roller by a transmission half-shaft.

Figure 2:
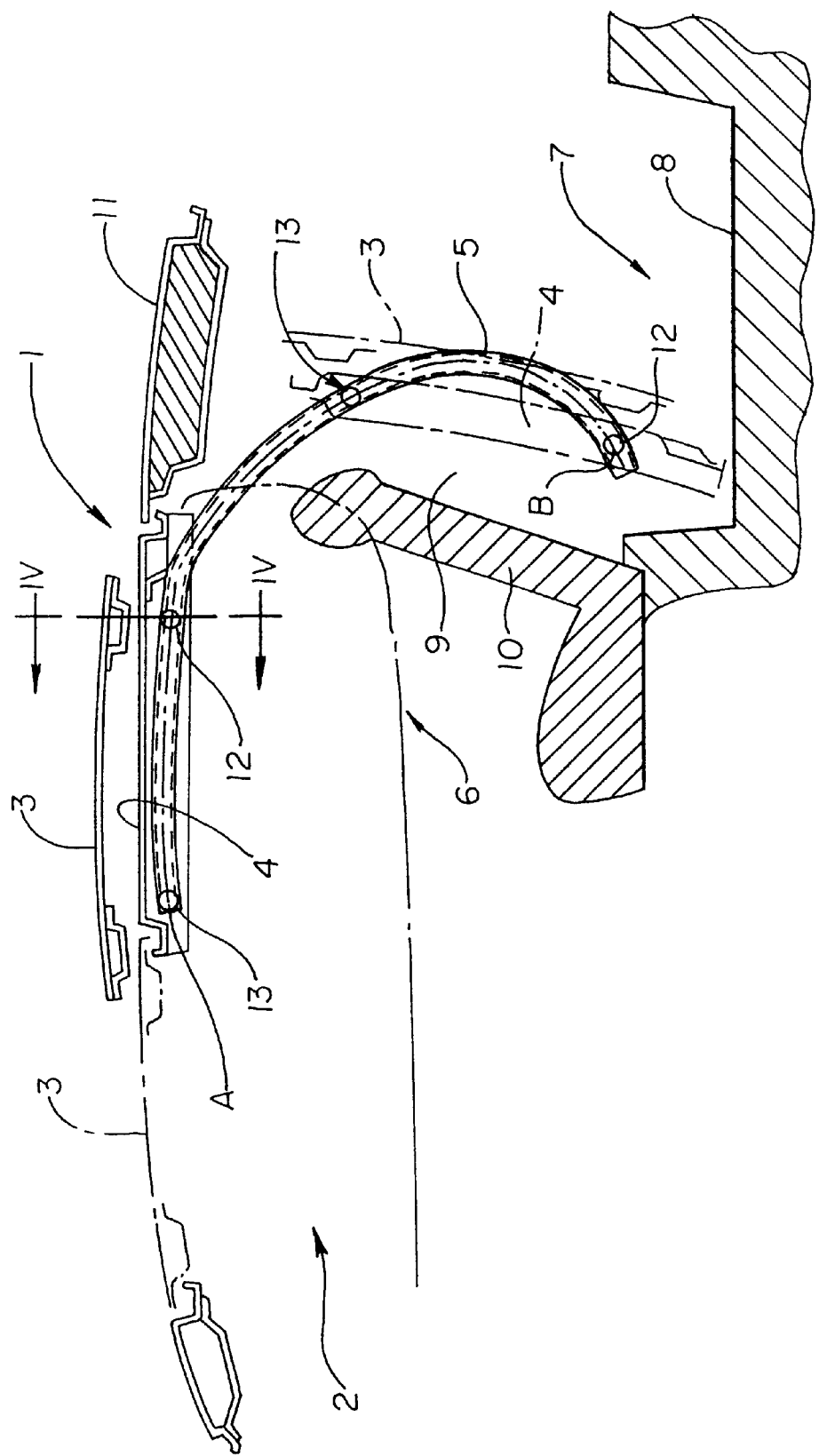
Figure 3:
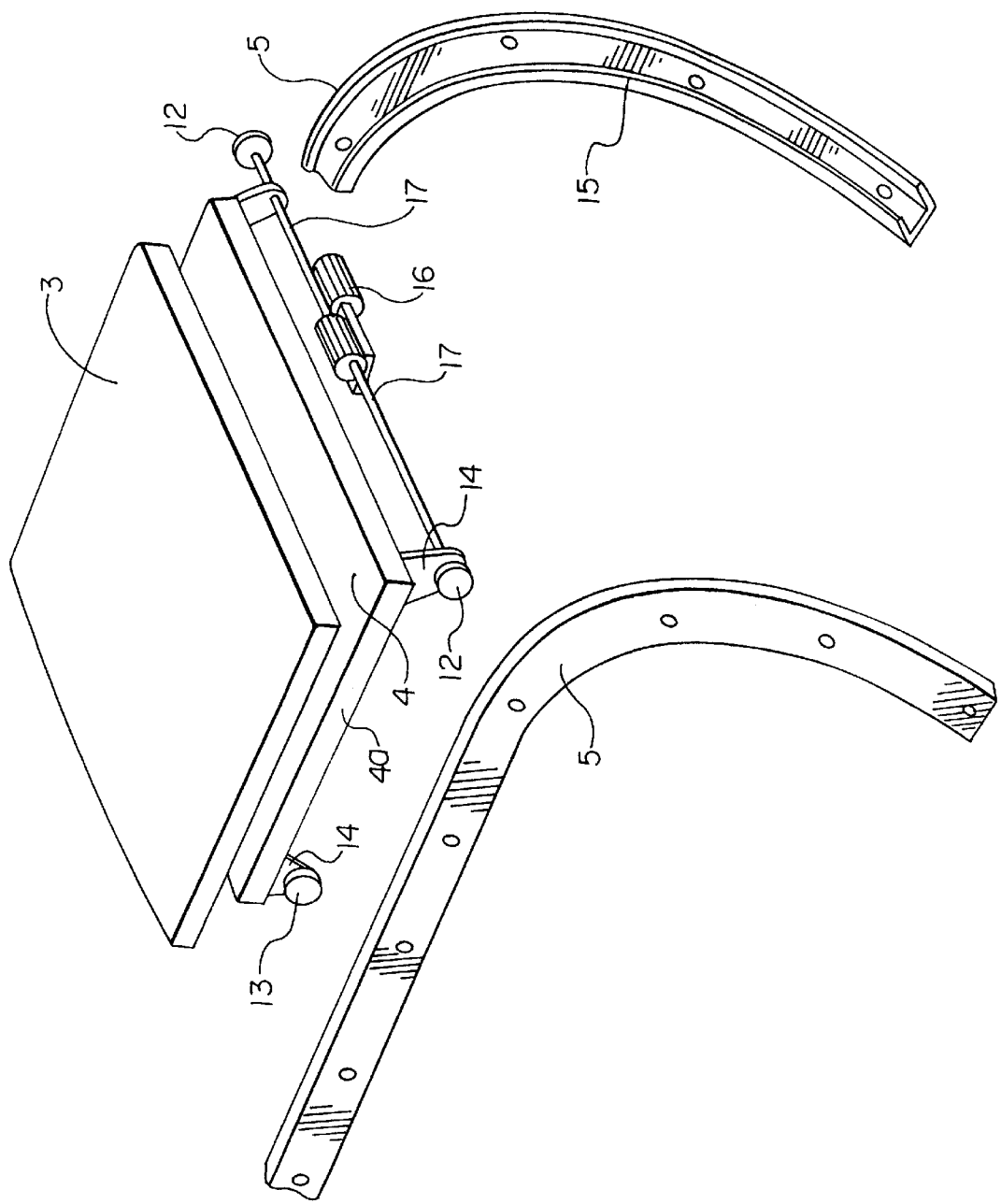
Figure 4:
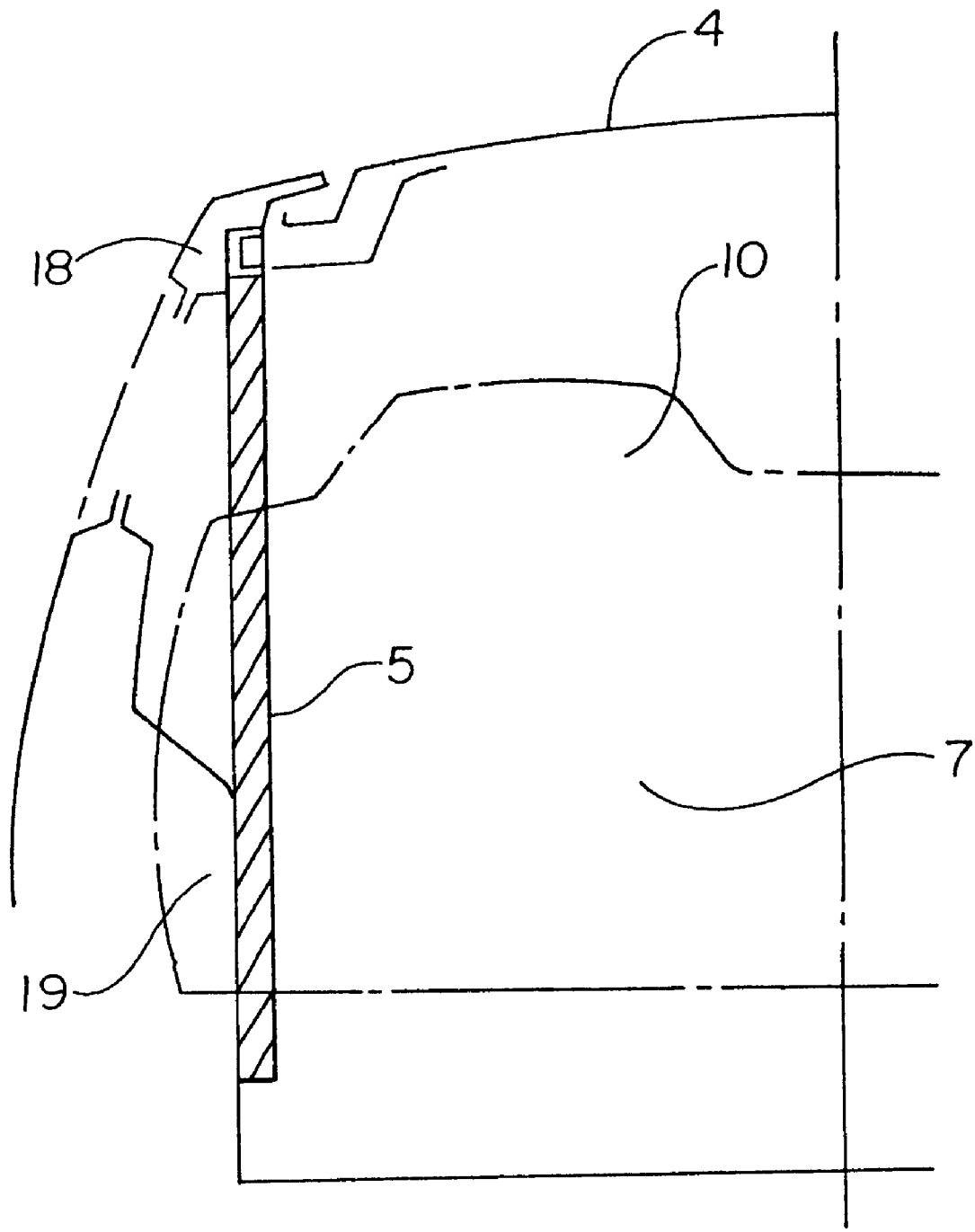
Figure 5:
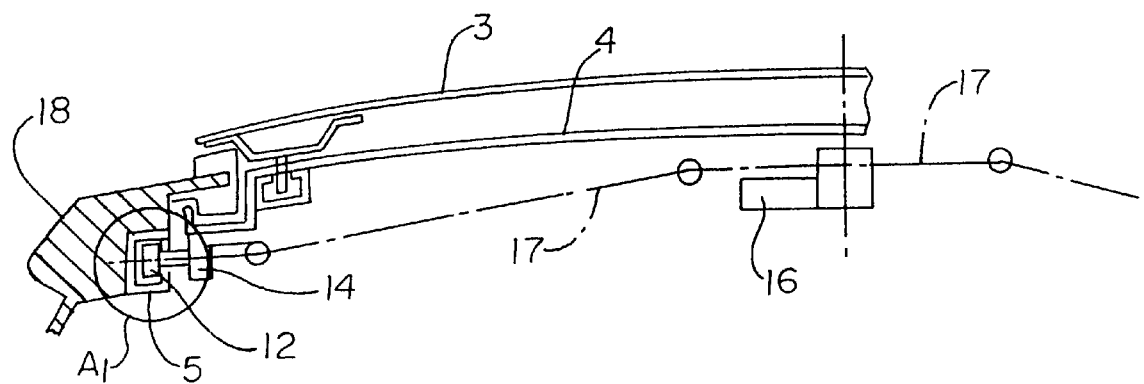
Figure 6:
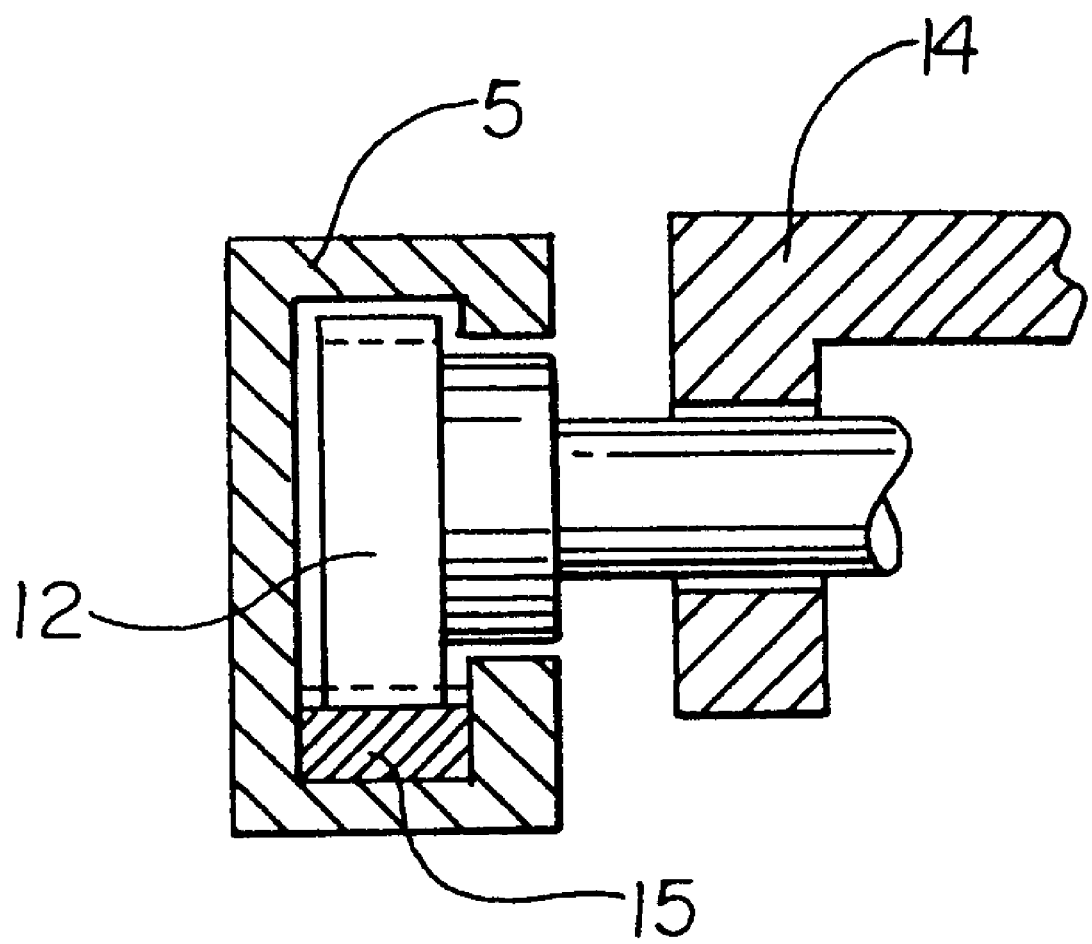

Other particularities and advantages of the present invention will emerge from the following detailed description:

In the accompanying drawings, given solely by way of non-limitative examples:

FIG. 1 is a schematic view of a vehicle equipped with a sunroof system according to the invention, FIG. 2 is a view in partial longitudinal section of a vehicle equipped with the sunroof system according to the invention, FIG. 3 is a view in perspective of the sunroof system, FIG. 4 is a half cross-section of the rear part of the vehicle, FIG. 5 is a half-section along the plane IV—IV in FIG. 2, FIG. 6 is a view to a larger scale of the detail $A_1$ in FIG. 5.

In the embodiment depicted in FIGS. 1, 2, 3, the sunroof system for the vehicle (2) consists of two rigid panels, respectively a first front panel (3) and a second central panel (4), fixed to each other by sliding means (20) arranged so that the front panel (3) is able to move between a closed position (see FIG. 2) in which it is, after sliding towards the rear, superimposed on the central panel (4).

The central panel (4) is able to move whilst driving the front panel (3) which is superimposed on it, between a closed position, in which it covers the cabin, and an open position in which the front panel (3) and the central panel (4) are housed, in their superimposed position, substantially vertically behind the cabin (6) of the vehicle, as shown in dotted lines in FIG. 2.

The system which guides the movement of the panel (3) towards the position shown in solid lines in FIG. 2, in which the panel (3) is situated on the panel (4), will not be described in detail here.

This is because it was described in the French patent FR-B-2694245 and in the French patent application No. 9 910 204 of Aug. 5, 1999 in the name of the Applicant.

In accordance with the invention, the sunroof system has two parallel arched runners (5) fixed to the bodywork of the vehicle (2).

These runners (5) each extend between a point A close to the front of the central panel (4) and a point B close to the bottom (8) of the rear boot (7) of the vehicle and of the rear part (9) of the cabin (6).

The central panel (4) has members which will be detailed below cooperating with the two runners (5) in order to guide its movement along these.

As can be seen notably in FIG. 2, the arched shape of the runners (5) has a convexity directed towards the inside of the boot (7).

This arched shape guides the movement of the panels (3, 4) through a passage between the rear seat (10) and the fixed rear part (11) of the roof.

The members of the panel (4) cooperating with the two runners (5) comprise two rollers (12, 13) fixed to lugs (14) situated close to each of the lateral edges (4a) of the central panel, respectively close to the front and close to the rear of the latter, as indicated in FIGS. 2 and 3.

The sunroof system according to the invention also has means for driving the movement of the central panel (4) along the two runners (5).

These means can comprise cables driven by a motor or a ram. Preferably, the rollers (12, 13) are shaped like pinions (see FIGS. 3, 5 and 6) meshed in a rack (15) fixed to each roller (5) and following the profile of the latter.

As can be seen in FIGS. 3 and 5, the pair of rollers (12) situated close to the rear of the panel (4) is driven in rotation by an electric motor connected to each roller by a transmission half-shaft (17).

FIG. 4 shows on the one hand that each runner (5) is fixed at its top part to one of the two side parts (18) of the fixed roof, situated on each side of the roof opening.

In addition, each runner (5) is fixed at its bottom part to one of the two side parts (19) of the bodywork situated inside the boot (7).

The sunroof system which has just been described functions in the following manner.

In a first step, a suitable mechanism controls the sliding of the front panel (3) towards the rear, until this panel is superimposed on the central panel (4) as indicated in FIG. 2.

In this position, the two panels are locked on each other.

The starting of the electric motor (16) is then actuated.

This rotates the half-shafts (17) and the rollers (12) in the form of a pinion.

The rotation of the rollers (12) on the racks (15) of the runners (5) moves the panels (3, 4) towards the boot, until the rollers arrive at their end of travel, close to point B.

In this position, the two panels (3, 4) occupy an almost vertical position, by virtue of the curvature of the runners (5).

By actuating the rotation of the electric motor in the reverse direction, the panels (3, 4) move from the boot to the roof closure position.

What is claimed is:

1. A sunroof system for a vehicle, comprising at least two rigid panels, respectively a first, front panel and a second, central panel, fixed to each other by sliding means arranged in such a way that the front panel is able to move between a closed position in which it covers a cabin and an open position in which it is, after sliding towards the rear, superimposed en over a top of the central panel, the latter being able to move, whilst driving the front panel which is superimposed on it, between a closed position in which it covers the cabin and an open position in which the front panel and the central panel are housed, in their superimposed position, substantially vertically behind the cabin of the vehicle, characterized in that it has two parallel arched runners fixed to the vehicle bodywork and each extending between a point (A) close to the front of the central panel and a point (B) close to a bottom of a rear boot of the vehicle and a rear part of the cabin, the central panel having members cooperating with the two runners in order to guide its movement along these.

2. A sunroof system according to claim 1, characterized in that the arched shape of the runners has a convexity directed towards an inside of the boot.

3. A sunroof system according to claim 1, characterized in that the members cooperating with the two runners comprise two rollers fixed close to each of side edges of the central panel, respectively close to the front and close to the rear of the latter.

4. A sunroof system according to claim 1, characterized in that it has means for driving the movement of the central panel along the two runners.

5. A sunroof system according to claim 3, characterized in that the rollers are pinions meshed in a rack fixed to each runner and following a profile of the latter.

6. A sunroof system according to claim 5, characterized in that one of the pairs of rollers is rotated by an electric motor connected to each roller by a transmission half-shaft.

7. A sunroof system according to claim 1, characterized in that each runner is fixed at its top part to one of two side parts of a fixed roof having an opening, each runner being situated on each side of the roof opening.

8. A sunroof system according to claim 1, characterized in that each runner is fixed at its bottom part to one of two side parts of the bodywork situated inside the boot.

* * * * *